(12) United States Patent
Chapple

(10) Patent No.: US 10,731,290 B2
(45) Date of Patent: Aug. 4, 2020

(54) LIQUID FLAME RETARDANT COMPOSITION

(71) Applicant: CSIR, Pretoria (ZA)

(72) Inventor: Stephen Anthony Chapple, Port Elizabeth (ZA)

(73) Assignee: CSIR, Pretoria (ZA)

( * ) Notice: Subject to any disclaimer, the term of this patent is extended or adjusted under 35 U.S.C. 154(b) by 196 days.

(21) Appl. No.: 15/318,324

(22) PCT Filed: Jun. 12, 2015

(86) PCT No.: PCT/IB2015/054450
§ 371 (c)(1),
(2) Date: Dec. 12, 2016

(87) PCT Pub. No.: WO2015/189810
PCT Pub. Date: Dec. 17, 2015

(65) Prior Publication Data
US 2017/0130392 A1    May 11, 2017

(30) Foreign Application Priority Data
Jun. 13, 2014   (ZA) .................... 2014/04384

(51) Int. Cl.
| | | |
|---|---|---|
| *D06M 11/68* | (2006.01) | |
| *C09K 21/04* | (2006.01) | |
| *C09K 21/12* | (2006.01) | |
| *D06M 13/44* | (2006.01) | |
| *B27K 3/52* | (2006.01) | |
| *D06M 101/06* | (2006.01) | |

(52) U.S. Cl.
CPC .............. *D06M 11/68* (2013.01); *B27K 3/52* (2013.01); *C09K 21/04* (2013.01); *C09K 21/12* (2013.01); *D06M 13/44* (2013.01); *B27K 2200/10* (2013.01); *B27K 2240/30* (2013.01); *D06M 2101/06* (2013.01); *D06M 2200/30* (2013.01)

(58) Field of Classification Search
CPC ............. D06M 11/68; D06M 2101/06; D06M 2200/30; D06M 13/44; B27K 3/52; B27K 2200/10; B27K 2240/30; C09K 21/04; C09K 21/12
See application file for complete search history.

(56) References Cited

U.S. PATENT DOCUMENTS

| | | | |
|---|---|---|---|
| 2,194,827 A | 3/1940 | Gordon | |
| 3,524,761 A | 8/1970 | Humphrey | |
| 6,319,431 B1 | 11/2001 | Basson et al. | |
| 2004/0121114 A1* | 6/2004 | Piana | ................... D06M 11/82 428/85 |
| 2014/0093742 A1 | 4/2014 | Saari | |

FOREIGN PATENT DOCUMENTS

| | | | |
|---|---|---|---|
| CN | 101892057 B | | 10/2012 |
| CN | 102950632 A | | 3/2013 |
| GB | 671699 | * | 5/1952 |
| GB | 903388 | | 8/1962 |
| WO | 2002/102926 A1 | | 12/2002 |

OTHER PUBLICATIONS

Nanaumi et al. Derwent 1988-357645, 1988.*
International Search Report and Written Opinion received for PCT Patent Application No. PCT/IB2015/054450, dated Sep. 7, 2015, 10 Pages.
International Preliminary Report on Patentability received for PCT Patent Application No. PCT/IB2015/054450, dated Sep. 7, 2016, 18 pages.

* cited by examiner

*Primary Examiner* — Amina S Khan
(74) *Attorney, Agent, or Firm* — Morrison & Foerster LLP

(57) ABSTRACT

A liquid flame retardant composition is in the form of an admixture which includes a phosphate-based flame retardant, ammonium hydroxide and zinc borate. The invention extends to a method of providing a phosphate-based liquid flame retardant composition, to the use of a phosphate-based flame retardant, ammonium hydroxide and a zinc borate in the manufacture of a liquid flame retardant composition, to a cellulosic material treated with the liquid flame retardant composition and to a method of inhibiting strength loss in a cellulosic material when the cellulosic material is exposed to heat.

19 Claims, No Drawings

LIQUID FLAME RETARDANT COMPOSITION

This application is a U.S. national stage application of PCT/IB2015/054450, filed internationally on Jun. 12, 2015, which claims priority to South African Patent Application No. 2014/04384, filed Jun. 13, 2014, which are incorporated herein by reference in their entireties.

THIS INVENTION relates to flame retardancy. In particular, the invention relates to a liquid flame retardant composition, to a method of producing a phosphate-based liquid flame retardant composition, to a cellulosic material treated with a liquid flame retardant composition and to a method of inhibiting strength loss in a cellulosic material when the cellulosic material is exposed to heat.

Phosphoric acid and its salts have been used for a long time as flame retardants for natural fibres such as cellulosic materials. Ammonium phosphate salts (for example monoammonium phosphate and diammonium phosphate) have by themselves been used to provide non-durable flame retardancy for cellulosic textiles and paper, and treatments for wood (see for example Lyons J. W. *Cellulose: Textiles in The Chemistry & Uses of Fire Retardants*, pp 122-123, 143-145, 169-170, Wiley Interscience, New York, 1970 and Lewin M. and Sello S. B. *Flameproofing of Cellulosics* in Lewin M., Atlas S. M. and Pearce E. M. (Eds.), *Flame-Retardant Polymeric Materials*, pp 23-24, Plenum Press, New York, 1975). The phosphorous-based salts can be used on their own or in combination with other fire retardants. These include inorganic boron compounds, where boric acid and water soluble sodium tetraborate (borax) are useful, and nitrogen compounds such as urea and guanidine.

In this specification, the terms flame retardant and fire retardant are used interchangeably.

The phosphate salts, alone or in combination with boron and/or nitrogen compounds, are relatively inexpensive and provide excellent fire retardancy and glow-proofing. They are, however, non- or semi-durable showing a lack of resistance to water leaching to varying degrees. This is not a problem where the treated cellulosic material is used for certain applications such as in composite materials because the cellulosic material is encapsulated in a polymeric resin.

These non- and semi-durable phosphate-based flame retardants however have a further disadvantage in that they cause a loss in strength in cellulosic materials when the cellulosic materials are exposed to elevated temperatures. This is a result of the formation of acidic species which degrade the cellulose at the higher temperatures used for drying and/or curing (see for example Lyons J. W. *Cellulose: Textiles* in *The Chemistry & Uses of Fire Retardants*, pp 170-172, Wiley Interscience, New York, 1970, Shen K. K., Kochesfahani S. H. and Jouffret F., *Boron-Based Flame Retardants and Flame Retardancy*, in *Fire Retardancy of Polymeric Materials*, pp 230, Taylor Francis Group, 2010, and Nuessle A. C., Ford F. M., Hall W. P. and Lippert A. L., *Some Aspects of the Cellulose-Phosphate-Urea Reaction*, Textile Research Journal, 26 (1) 1956). Obviously, if the treated cellulosic materials are to be used in the manufacture of composite materials more severe damage will occur when the process of composite material manufacture involves high temperatures, possibly for extended times.

Examples of commercial non-/semi-durable phosphate-based flame retardants include Flammentin® KRE (organic phosphorous nitrogen compound), Flammentin® MSG (aqueous mixture based on phosphorus and nitrogen organic compounds) and Flammentin® TL833 (aqueous mixture based on phosphorus and nitrogen compounds). These Flammentin® products are available from Thor Specialities, Inc. 50 Waterview Drive, Shelton, Conn. 06484, USA. It will be appreciated that these commercially available formulations may have an organic component, and may be formulated to reduce loss of fabric strength during normal (textile) treatment processes.

Ammonia (gas) is used in the production of flame retardants, for example, ammonium polyphosphates which are used in intumescent paints and polymers, and in the Proban® durable flame retardant treatment for cellulose textiles (see for example Hill D. J. (Ed.), Hall M. E., Holmes D. A., Lomas M. and Padmore K., *An Introduction to Textiles, Vol IV—Textile Wet Processing*, Eurotex, Guimaraes, 1993). Ammonium hydroxide (liquid) is generally not used and Nuessle et al. (1956) noted that the use of ammonium hydroxide in a phosphoric acid/urea treatment bath did not result in increased fabric strength.

Zinc borate is only sparingly soluble in water (0.1% at pH 5 and 7, and 0.03% at pH 9—EPA, 1991) and so has not found general use in the treatment of cellulosic materials via aqueous means. It has, however, found wide-spread use as a fire retardant/smoke suppressant in polymers, elastomers, coatings and sealants/caulks (see for example Shen K. K., Kochesfahani S. H. and Jouffret F., *Boron-Based Flame Retardants and Flame Retardancy*, in *Fire Retardancy of Polymeric Materials*, pp 230, Taylor Francis Group, 2010).

WO 2013/084023 A1 outlines the composition of a non-halogen flame retardant agent (non-halogenated flame retardant (phosphate-based)/alkali/smoke suppressant (zinc borate)) which is used to treat natural fibres in one of the stages in the manufacture of a flame-proofed artifact.

U.S. Pat. No. 3,524,761 describes the use of zinc ammonia borate complexes in aqueous solution which are used to impregnate combustible materials e.g. textiles. The zinc borate is reacted with aqueous ammonia (anhydrous ammonia in water or aqueous ammonia) to form water soluble zinc ammonium borates. Upon drying the complex decomposes to form water insoluble zinc borate residue which imparts flame retardance. The zinc ammonium borates can be added to formulations having other fire retardants present, such as chlorinated paraffins, antimony trioxide, phosphates etc.

WO 2012164143 describes a fire retardant composition and method for treating wood. The composition comprises phosphoric acid, di-ammonium phosphate, ammonium sulfate, urea, and a complexing agent. The composition may include a charring agent, for example zinc borate. The advantages of the system are low cost, the formation of a protective layer and/or foam on the treated wood, low toxicity, colour retention of the wood and a preservative function.

U.S. Pat. No. 2,769,730 describes a method for treating cellulosic materials with a substance resistant to fire, weathering action and fungal attack. The method includes treating a porous cellulose material with an ammoniacal solution of a zinc compound (including zinc borate), drying the material and then treating the material with a preservative comprising a hydrocarbon oil, a chlorinated phenol, a chlorinated hydrocarbon, an ester of phosphoric acid, and a petroleum wax.

US 20050222309 describes a phosphorus-containing flame retardant formulation for cellulose-containing mouldings, comprising a resin of an organic nitrogen compound and a phosphorus-containing flame retardant. The phosphorus-containing flame retardant formulation may include a phosphinic salt, diphosphinic salt, a polymer of the phosphinic salt or mixtures thereof. The formulation may also comprise a component which is an aluminium compound and/or titanium compound and/or zinc compound and/or zirconium compound.

Badritala A., Hashemi S. K. H., Kord B., Zabihzadeh S. M. and Safdari V. *Morphology and Mechanical Properties of Zinc Borate-Pretreated Poplar Wood Flour/Plastic Composite*, BioResources 8 (1), pp 913-922, 2013 describes a method for pre-treating wood flour with zinc borate. The zinc borate is dissolved in ethanol before the addition of water. The wood flour is then introduced to the solution and continuously stirred for 24 hr before drying. Composite specimens containing zinc borate had lower flexural, tensile, and impact strength, compared with untreated specimens.

Winandy J. E. *Effects of Fire Retardant Retention, Borate Buffers, and Redrying Temperature after Treatment on Thermal-Induced Degradation*, Forest Products Journal, 47 (6) pp 79-86, 1997, and Awoyemi L. and Westmark U., *Effects of Borate Impregnation on the Response of Wood Strength to Heat Treatment*, Wood Science and Technology, 39 (6), pp 484-491, 2005, and Awoyemi L., *Determination of Optimum Borate Concentration for Alleviating Strength Loss During Heat Treatment of Wood*, Wood Science and Technology, 42 (1), pp 39-45, 2008 describe the addition of borate-based buffers to fire retardant treatment chemicals for wood and application of borate-based buffer to wood to mitigate thermal degradation (strength loss) of the wood.

US 2013/0244527 A1 discloses flame retardant fibres, yarns, and fabrics made therefrom. The fabrics are constructed from fibres comprising a partially aromatic polyamide (synthetic fibre) and a non-halogenated flame retardant. The flame retardant is incorporated as an additive during the fibre spinning process. The partially aromatic polyamide fibres incorporating the flame retardant may be used alone to form yarns and fabrics or in combination with natural, synthetic or man-made fibres which may have also been treated with a flame retardant. The flame retardant may include zinc borate, but it is not added in the form of an aqueous solution.

WO 2012/06785 A1 discloses a non-halogenated flame retardant thermoplastic polyurethane (TPU) comprising a thermoplastic polyurethane polymer, an organic non-halogenated flame retardant package (organic phosphorous compound (melamine free), organic phosphate in combination with an organic phosphoric acid, zinc oxide, stabilizer, inorganic flame retardant compound, and non-flame retardant additives). The flame retardant components are incorporated during the making of the TPU and/or with the TPU polymer pellets in a subsequent process. The TPU has excellent tensile strength and improved high flame performance and low smoke properties.

WO 2005/101976 A2 discloses fire retarded polyolefin polymers and copolymers which are halogen-free, antimony-free and phosphate-free. The fire retardants used are expandable graphite, a nitrogen-containing flame retardant (triazine ring-containing compound e.g. melamine) and metal hydroxide additives (or mixture of metal hydroxide and halogen-free and phosphorus-free flame retardants of other types).

A number of patent documents relate to improvements in the fire retardancy of synthetic polymers, as shown by the documents listed below. Use of zinc borate in synthetic polymers is also widely known.

CN103113688 discloses a flame retardant suppressant for a polyvinyl chloride (PVC) material. The suppressant comprises aluminium hydroxide, ammonium octamolybdate, zinc borate, zinc molybdate, zinc oxide and steric acid.

CN103044712 (A) discloses a halogen-free smoke suppression system for polypropylene comprising modified magnesium hydroxide, melamine, ammonium polyphosphate and zinc borate.

WO 2013115538 (A1) discloses a non-halogen-based flame retardant for a polycarbonate resin.

JP 2013124340 (A) discloses a flame retardant polypropylene. The flame retardant comprises piperazine pyrophosphate and melamine cyanurate.

CN 103172948 (A) discloses a polyvinyl chloride (PVC) plastic plate with fire retardant properties. The fire retardants used include lead sulphate tribasic, talcum powder and antimony trioxide.

CN 103102544 (A) discloses a zero-halogen cable material and preparation thereof. Zinc borate is included in the preparation.

A liquid flame retardant composition which, when applied to a cellulosic material, reduces loss of strength of the cellulosic material when the cellulosic material is exposed to heat, compared to the loss of strength experienced with treatment of conventional flame retardants or flame retardant compositions, would be desirable.

According to one aspect of the invention, there is provided a liquid flame retardant composition which is in the form of an admixture which includes a phosphate-based flame retardant, ammonium hydroxide and zinc borate.

The flame retardant composition may be a non-halogenated flame retardant composition, i.e. a flame retardant composition which includes a non-halogenated flame retardant as the only or as the major (highest concentration) flame retardant. Said major flame retardant may be said phosphate-based flame retardant. Instead, said major flame retardant may be present in admixture with said phosphate-based flame retardant.

In this specification, the term "flame retardant" refers to a substance, other than water, ammonium hydroxide and zinc borate, that, when applied or added to a material, is capable of delaying the ignition of the material or suppressing or reducing the flammability of the material.

The phosphate-based flame retardant may be a non-durable or a semi-durable flame retardant.

The phosphate-based flame retardant may be or may include a phosphorous-nitrogen compound, e.g. an ammonium phosphate such as an ammonium polyphosphate, monoammonium phosphate or diammonium phosphate.

The phosphate-based flame retardant may be or may include an organic compound, e.g. an organic polymer.

In one embodiment of the invention, the phosphate-based flame retardant includes or is a compound selected from the group consisting of diammonium phosphate, a mixture of diammonium phosphate and urea, an organic phosphorous-nitrogen phosphate compound, a mixture of organic and inorganic phosphorous and nitrogen compounds of which at least one is a phosphate, a nitrogen-containing phosphoric acid salt, and mixtures of two or more of these.

In one embodiment of the invention the phosphate-based flame retardant is or includes diammonium phosphate.

In another embodiment of the invention the phosphate-based flame retardant is or includes a mixture of diammonium phosphate and urea.

In yet another embodiment of the invention the phosphate-based flame retardant is an aqueous mixture of phosphorous and nitrogen organic compounds, e.g. Flammentin® MSG, which is described as a nitrogen containing phosphonic acid salt composition.

In still another embodiment of the invention the phosphate-based flame retardant is an aqueous mixture of phosphorous and nitrogen compounds, e.g. Flammentin® TL 833, which is believed to contain diammonium phosphate as the major flame retardant in the composition, and may possibly include an acrylic resin or polymer.

In a further embodiment of the invention the phosphate-based flame retardant is an aqueous mixture of organic and inorganic phosphorous and nitrogen compounds, e.g. Flammentin® KRE.

The zinc borate typically acts as a smoke suppressant.

The zinc borate may be any of the hydrates of zinc borate, or the zinc borate may be zinc borate anhydrous. Examples of zinc borate useful in the flame retardant composition of the invention thus includes $2ZnO \cdot 3B_2O_3 \cdot 3.5H_2O$, $2ZnO \cdot 3B_2O_3$, $4ZnO \cdot B_2O_3 \cdot H_2O$, $4ZnO \cdot 6B_2O_3 \cdot 7H_2O$ and $2ZnO \cdot 2B_2O_3 \cdot 3H_2O$. The latter, i.e. $2ZnO \cdot 2B_2O_3 \cdot 3H_2O$ is preferred in at least some embodiments of the flame retardant composition of the invention. Typically, sparingly water-soluble zinc borate is thus used as opposed to water-soluble borate salts.

The flame retardant composition may include between about 5% and about 50% by mass, preferably between about 5% and about 40% by mass, most preferably between about 10% and about 30% by mass of the phosphate-based flame retardant, where the phosphate-based flame retardant is on a solids basis (e.g. on the basis of a dry salt).

The flame retardant composition may include between about 5% and about 30% by mass, preferably between about 5% and about 25% by mass, most preferably between about 8 and about 20% by mass of the ammonium hydroxide.

The flame retardant composition may include between about 1% and about 25% by mass, preferably between about 2% and about 15% by mass, most preferably between about 3% and about 7% by mass, of the zinc borate.

The flame retardant composition typically includes water and thus is typically in the form of an aqueous solution or suspension or dispersion.

The flame retardant composition may include between about 10% and about 90% by mass, preferably between about 20% and about 80% by mass, most preferably between about 30% and about 60% by mass of water.

According to another aspect of the invention, there is provided a method of providing a phosphate-based flame retardant composition, the method including adding a zinc borate to an ammoniated aqueous solution which includes a phosphate-based flame retardant.

The method may include preparing said ammoniated aqueous solution which includes a phosphate-based flame retardant by adding ammonium hydroxide to an aqueous solution of a phosphate-based flame retardant.

The phosphate-based flame retardant may be as hereinbefore described.

The zinc borate may be as hereinbefore described.

The method may include preparing said aqueous solution of a phosphate-based flame retardant by admixing water and the phosphate-based flame retardant.

Instead, said aqueous solution of a phosphate-based flame retardant may be a commercially available flame retardant or flame retardant composition, e.g. Flammentin® TL 833, Flammentin® KRE or Flammentin® MSG, or similar commercial products possibly available under different brand names or trade names.

The ammonium hydroxide may be an aqueous ammonia solution with an ammonia concentration of between about 10% and about 35% by mass, preferably between about 20% and about 32% by mass, most preferably between about 25% and about 32% by mass.

The addition of the ammonium hydroxide to the aqueous solution of the phosphate-based flame retardant should be such that the formation of a precipitate (typically white) is avoided. The ammonium hydroxide may thus be added in multiple steps, e.g. drop-wise to the aqueous solution of the phosphate-based flame retardant.

Sufficient ammonium hydroxide should be added to the aqueous solution of the phosphate-based flame retardant to ensure that said ammoniated aqueous solution which includes the phosphate-based flame retardant is milky in appearance.

Adding a zinc borate to said ammoniated aqueous solution which includes a phosphate-based flame retardant may include agitating, e.g. stirring, the ammoniated aqueous solution which includes a phosphate-based flame retardant to which the zinc borate is being added.

The method may include continuously stirring or agitating the phosphate-based flame retardant composition, e.g. until it is to be applied to a substrate or material.

The method may include maintaining the phosphate-based flame retardant composition at a temperature of between about 25° C. and about 45° C., preferably between about 30° C. and about 40° C. Excessive heating will however cause the zinc borate and/or the phosphate-based flame retardant to come out of solution and should thus be avoided.

The invention extends to the use of a phosphate-based flame retardant, ammonium hydroxide and a zinc borate in the manufacture of a liquid flame retardant composition.

The phosphate-based flame retardant, the ammonium hydroxide and the zinc borate may be as hereinbefore described.

Advantageously, the flame retardant composition, when applied to cellulosic material, inhibits or reduces strength loss of the cellulosic material when the cellulosic material is exposed to heat, e.g. heat experienced during short-term heating in the manufacturing of a composite material which includes the cellulosic material (e.g. a panel such as the panel described in WO 2013/084023), e.g. during compression moulding, compared to conventional phosphate-based flame retardants or flame retardant compositions.

According to a further aspect of the invention, there is provided a cellulosic material treated with a liquid flame retardant composition as hereinbefore described.

The treated cellulosic material of the invention typically shows a reduced strength loss when exposed to heat (e.g. the heat experienced during short-term heating in a compression moulding process) than the same cellulosic material when treated with a conventional phosphate-based flame retardant or flame retardant composition, i.e. a flame retardant composition which does not include in combination a phosphate-based flame retardant, ammonium hydroxide and a zinc borate in effective concentrations.

The cellulosic material is typically comprised of natural fibres and may be in the form of a structure, e.g. a textile or cloth. The cellulosic material thus may be in the form of a woven or non-woven or knitted fabric or a combination thereof.

In one embodiment of the invention, the cellulosic material is flax, e.g. in the form of a woven flax fabric or flax textile.

In another embodiment of the invention, the cellulosic material is cotton, e.g. in the form of a cotton woven fabric.

Other natural cellulosic fibres may be suitable for use in the invention, including bast fibres like hemp and kenaf, and other fibres such as bamboo.

The treated cellulosic material may form part of a composite material, e.g. a composite material which includes a polymeric material or resin. Thus, in one embodiment of the invention, the treated cellulosic material is incorporated in a pre-preg. The polymeric material or resin may be a thermoset resin, for example a phenolic based resin. In one embodiment of the invention, the polymeric material or resin is Eponol (trade name) Resin 2485 obtainable from Momentive Specialty Chemicals Inc. of 180 East Broad Street, Columbus, Ohio, USA. EPONOL™ Resin 2485 is a phenolic resin which is designed for pre-preg applications. In another embodiment of the invention, the polymeric material or resin is a poly furfuryl alcohol resin.

The treated cellulosic material may be impregnated with the flame retardant composition. Impregnation of the cellulosic material may be effected, for example, by known methods of impregnation of natural fibres such as padding of the flame retardant composition onto the cellulosic material.

According to yet another aspect of the invention, there is provided a method of inhibiting strength loss in a cellulosic material when the cellulosic material is exposed to heat, the method including treating the cellulosic material with a liquid flame retardant composition which includes a phosphate-based flame retardant, ammonium hydroxide and a zinc borate.

Without wishing to be bound by theory, the inventor believes that the reduction in strength loss in a cellulosic material when the cellulosic material is exposed to heat can be attributed to the combination of the phosphate-based flame retardant and the zinc borate, with the ammonium hydroxide assisting in getting the zinc borate into solution allowing aqueous application. Aqueous application in turn further inhibits strength loss in a cellulosic material when the cellulosic material is exposed to heat, because the zinc borate is initially in solution and not merely present as very fine particles.

This method advantageously also imparts flame retardancy to the cellulosic material, in addition to inhibiting the strength loss of the cellulosic material as a result of the flame retardancy treatment.

The cellulosic material may be as hereinbefore described.

The flame retardant composition may be as hereinbefore described.

The method thus advantageously may also lead to a reduction in the heat release (peak) value, as measured using a cone colorimeter with a heat flux of 35 kW/m$^2$, a horizontal orientation of the cellulosic material (woven fabric), spark ignition, two layers of the woven fabric, with data reduced to 290 seconds, according to ISO 5660-1:2002 Reaction-To-Fire Tests—Heat release, smoke production and mass loss rate, for the treated cellulosic material when compared with untreated cellulosic material, or with cellulosic material treated with a phosphate-based flame retardant only.

When the cellulosic material is a flax fabric, the treated flax fabric may have a heat release (peak) value of less than about 20 kW/m$^2$, preferably less than about 15 kW/m$^2$, most preferably less than about 10 kW/m$^2$.

The method may advantageously also lead to a reduction in the smoke factor, as determined according to ISO 5660-1:2002 Reaction-To-Fire Tests—Heat release, smoke production and mass loss rate, for the treated cellulosic material when compared with untreated cellulosic material, or with cellulosic material treated with a phosphate-based flame retardant only. The smoke factor is the product of the peak heat release rate and total smoke release and compensates for incomplete combustion of flame retardant treated samples.

When the cellulosic material is a flax fabric, the treated flax fabric may have a smoke factor of less than about 440 kW/m$^2$, preferably less than about 400 kW/m$^2$, more preferably less than about 300 kW/m$^2$, most preferably less than about 200 kW/m$^2$.

The method advantageously may also lead to a reduction in the heat release (2 minutes) for the treated cellulosic material when compared with untreated cellulosic material, or with cellulosic material treated with a phosphate-based flame retardant only.

When the cellulosic material is a flax fabric, the treated flax fabric may have a total heat release (2 minutes) value of less than about 23 kW·min/m$^2$, preferably less than about 20 kW·min/m$^2$, more preferably less than about 18 kW·min/m$^2$, most preferably less than about 15 kW·min/m$^2$.

When the cellulosic material is a flax fabric, the treated flax fabric may have a total heat release (5 minutes) value of less than about 47 kW·min/m$^2$, preferably less than about 45 kW·min/m$^2$, more preferably less than about 25 kW·min/m$^2$, most preferably less than about 20 kW·min/m$^2$.

When the cellulosic material is a flax fabric, the treated flax fabric may show a tensile strength loss, when subjected to a first stage heating of 90 minutes at 100° C. followed by a second stage heating of 120 minutes at 160° C., of less than about 30%, preferably less than about 28%, more preferably less than or equal to about 25%.

When the cellulosic material is a flax fabric, the treated flax fabric may show a tensile strength loss, when subjected to a first stage heating of 90 minutes at 100° C. followed by a second stage heating of 120 minutes at 145° C., of less than about 30%, preferably less than about 26%, more preferably less than about 20%, most preferably less than about 15%.

The invention will now be described and exemplified in more detail with reference to the following non-limiting examples.

EXAMPLE 1

A flame retardant composition in accordance with the invention was prepared. To 183 ml water there was added 140 ml Flammentin® TL833. 77 ml ammonium hydroxide (25%) was then added drop-wise with stirring. 17.56 g zinc borate (ZB-223, i.e. 2ZnO·2B$_2$O$_3$·3H$_2$O) was added gradually with stirring. The product was maintained at 35-40° C.

EXAMPLE 2

A flame retardant composition in accordance with the invention was prepared. To 142 ml of water there was added 55.44 g of diammonium phosphate and 101.76 g urea. The solution was heated to 25-30° C. 58 ml ammonium hydroxide (25%) was then added drop-wise with stirring. The solution was heated to 35-40° C. 13.17 g zinc borate (ZB-223) was added gradually with stirring. The product was maintained at 35-40° C.

EXAMPLE 3

A flame retardant composition in accordance with the invention was prepared. To 71 ml of water there was added 27.72 g diammonium phosphate. 29 ml of ammonium hydroxide was then added drop-wise with stirring. The solution was heated to 35-40° C. 6.58 g zinc borate (ZB-223) was added gradually with stirring. The product was maintained at 35-40° C.

EXAMPLE 4

A flame retardant composition in accordance with the invention was prepared. To 114 ml water there was added 116 ml Flammentin® MSG. 70 ml of ammonium hydroxide (25%) was then added with stirring. 17.56 g zinc borate (ZB-223) was added gradually with stirring. The product was maintained at 35-40° C.

EXAMPLE 5

A flame retardant composition in accordance with the invention was prepared. To 229 ml of water there was added 175 ml Flammentin® KRE. 96 ml of ammonium hydroxide (25%) was then added drop-wise with stirring. The solution was heated to 35-40° C. 21.95 g zinc borate (ZB-223) was added gradually with stirring. The product was maintained at 35-40° C.

EXAMPLE 6

A comparative flame retardant composition not in accordance with the invention was prepared. To 78 ml of water there was added 42 ml of Flammentin® MSG. The solution was heated to 35-40° C. 5.27 g zinc borate (ZB-223) was added gradually with stirring. The product was maintained at 35-40° C.

EXAMPLE 7

A comparative flame retardant composition not in accordance with the invention was prepared. To 162.5 ml of water there was added 82.5 ml of Flammentin® KRE. The solution was heated to 35-40° C. 10.98 g zinc borate (ZB-223) was added gradually with stirring. The product was maintained at 35-40° C.

EXAMPLE 8—TOTAL HEAT RELEASE

The efficacy of the flame retardant composition of the invention was examined using a cone calorimeter in accordance with ISO 5660-1:2002 Reaction-To-Fire Tests—Heat release, smoke production and mass loss rate, (Heat flux 35 kW/m$^2$, horizontal orientation of the cellulosic material (woven flax fabric), spark ignition, two layers of fabric, data reduced to 290 seconds). The flame retardant composition of the invention was compared to a flame retardant or flame retardant composition used in the composition of the invention but excluding ammonium hydroxide and zinc borate, i.e. on its own. Woven flax fabrics were treated with Flammentin® TL833 at two levels: intermediate (18-20% on weight of fabric (owf)) and high (23-26% owf). Woven flax fabrics were also treated with the flame retardant composition of the invention prepared in similar fashion to the flame retardant composition of Example 1, using the same concentrations of Flammentin® TL833 but with two levels of zinc borate: low (1.6-1.8% owf) and high (4.6-5.1% owf). The total heat release values after 2 minutes and 5 minutes are set out in Table 1.

TABLE 1

| Sample | Flame retardant (Flammentin® TL833) level | Zinc borate level | Total heat release (2 min) (kW · min/m$^2$) | Total heat release (5 min) (kW · min/m$^2$) |
|---|---|---|---|---|
| Flammentin® TL833 as is | intermediate | none | 24.2 | 56.1 |
| Invention flame retardant composition | intermediate | low | 22.0 | 45.3 |
| Invention | intermediate | high | 15.3 | 43.8 |
| Flammentin® TL833 as is | high | none | 24.9 | 53.9 |
| Invention flame retardant composition | high | low | 18.1 | 47.6 |
| Invention flame retardant composition | high | high | 12.0 | 17.7 |

Compared to the Flammentin® TL833 as is, the invention flame retardant composition resulted in lower levels of total heat release at 2 and 5 minutes. Compared to the low level, a high level of zinc borate in the invention resulted in a decrease in the total heat release for both concentrations of Flammentin® TL833.

EXAMPLE 9—PEAK HEAT RELEASE AND SMOKE FACTOR

The peak heat release and smoke factor for each sample were also determined and are shown in Table 2.

TABLE 2

| Sample | Flammentin® TL833 level | Zinc borate level | Peak heat release rate (kW/m$^2$) | Smoke Factor (kW/m$^2$) |
|---|---|---|---|---|
| Flammentin® TL833 as is | intermediate | none | 18.8 | 442 |
| Invention flame retardant composition | intermediate | low | 18.1 | 438 |
| Invention flame retardant composition | intermediate | high | 14.9 | 301 |
| Flammentin® TL833 as is | high | none | 21.8 | 521 |
| Invention flame retardant composition | high | low | 17.8 | 429 |
| Invention flame retardant composition | high | high | 9.2 | 195 |

Compared to the Flammentin® TL833 on its own, the invention flame retardant composition resulted in lower peak heat release rates. The peak heat release rate is a measure of how large a fire will grow. Compared to the Flammentin® TL833 on its own, the invention flame retardant composition resulted in lower smoke factors.

The smoke factor is a product of the peak heat release rate and total smoke release and compensates for incomplete combustion of flame retardant treated samples. Compared to the low level, a high level of zinc borate in the flame retardant composition of the invention resulted in a lower peak heat release rate and smoke factor for both concentrations of Flammentin® TL833 flame retardant.

EXAMPLE 10

Flax samples were treated with the invention flame retardant composition prepared in accordance with Example 5 or with Flammentin® KRE on its own or with Flammentin® KRE admixed with zinc borate only. Treated samples were exposed to a heat profile in an oven and tensile strength was determined according to ISO 13934-1:1999 Textiles—Tensile properties of fabrics—Part 1: Determination of maximum force and elongation at maximum force using the strip method. The gauge length was 200 mm and the rate of extension was 100 mm/min. The results are shown in Table 3.

TABLE 3

| Sample | Tensile strength - after treatment (N) | Tensile strength - after 1$^{st}$ stage (N) | Tensile strength - after 1$^{st}$ and 2$^{nd}$ stages (N), % loss in brackets |
|---|---|---|---|
| Flammentin ® KRE as is | 1144 | 998 | 162 (86) |
| Flammentin ® KRE with no ammonium hydroxide but admixed with zinc borate | 1042 | 1044 | 609 (42) |
| Invention flame retardant composition | 1138 | 1113 | 815 (28) |

Heat profile: 1$^{st}$ stage: 90 minutes at 100° C., second stage: 120 minutes at 160° C., flax woven fabric.

The fabric treated with the invention flame retardant composition of Example 5 had a percentage loss of tensile strength of 28% after being exposed to the full heat profile compared to 86% for fabric treated with the Flammentin® KRE on its own and 42% for fabric treated with the Flammentin® KRE admixed with zinc borate.

EXAMPLE 11

Flax samples were treated with the invention flame retardant composition prepared in accordance with Example 4 or with Flammentin® MSG on its own or with Flammentin® MSG admixed with either ammonium hydroxide or zinc borate, but not both. Treated samples were exposed to a heat profile in an oven and tensile strength was determined according to ISO 13934-1:1999 Textiles—Tensile properties of fabrics—Part 1: Determination of maximum force and elongation at maximum force using the strip method. The gauge length was 200 mm and the rate of extension was 100 mm/min. The results are shown in Table 4.

TABLE 4

| Sample | Tensile strength - after treatment (N) | Tensile strength - after 1$^{st}$ stage (N) | Tensile strength - after 1$^{st}$ and 2$^{nd}$ stages (N), % loss in brackets |
|---|---|---|---|
| Flammentin ® MSG as is | 1080 | 1122 | 591 (45) |
| Flammentin ® MSG admixed with ammonium hydroxide | 1024 | — | 520 (49) |
| Flammentin ® MSG with no ammonium hydroxide but admixed with zinc borate | 1201 | — | 795 (34) |
| Invention flame retardant composition | 1177 | 1238 | 888 (25) |

Heat profile: 1$^{st}$ stage: 90 minutes at 100° C., second stage: 120 minutes at 160° C., flax woven fabric.

The fabric treated with the invention flame retardant composition had a percentage loss of tensile strength of 25% after being exposed to the full heat profile compared to 45% for fabric treated with the Flammentin® MSG on its own, 49% for fabric treated with the Flammentin® MSG admixed with ammonium hydroxide and 34% for fabric treated with the Flammentin® MSG admixed with zinc borate.

EXAMPLE 12

Flax samples were treated with the invention flame retardant composition prepared in accordance with Example 1 or with Flammentin® TL833 on its own. Treated samples were exposed to a heat profile in an oven and tensile strength was determined according to ISO 13934-1:1999 Textiles—Tensile properties of fabrics—Part 1: Determination of maximum force and elongation at maximum force using the strip method. The gauge length was 200 mm and the rate of extension was 100 mm/min. The results are shown in Table 5.

TABLE 5

| Sample | Tensile strength - after treatment (N) | Tensile strength - after 1$^{st}$ stage (N) | Tensile strength - after 1$^{st}$ and 2$^{nd}$ stages (N), % loss in brackets |
|---|---|---|---|
| Flammentin ® TL833 as is | 1318 | 1395 | 148 (89) |
| Invention flame retardant composition | 1340 | 1337 | 361 (71) |

Heat profile: 1$^{st}$ stage: 90 minutes at 100° C., second stage: 120 minutes at 160° C., flax woven fabric.

The fabric treated with the invention flame retardant composition of Example 1 had a percentage loss of tensile strength of 71% after being exposed to the full heat profile compared to 89% for fabric treated with the Flammentin® TL833 on its own.

EXAMPLE 13

Flax samples were treated with the invention flame retardant composition prepared in accordance with Example 2 or with a mixture of diammonium phosphate and urea in the proportions described in Example 2. Treated samples were exposed to a heat profile in an oven and tensile strength was determined according to ISO 13934-1:1999 Textiles—Tensile properties of fabrics—Part 1: Determination of maximum force and elongation at maximum force using the strip method. The gauge length was 200 mm and the rate of extension was 100 mm/min. The results are shown in Table 6.

TABLE 6

| Sample | Tensile strength - after treatment (N) | Tensile strength - after 1$^{st}$ stage (N) | Tensile strength - after 1$^{st}$ and 2$^{nd}$ stages (N), % loss in brackets |
|---|---|---|---|
| Mixture of diammonium phosphate and urea | 1408 | 1391 | 362 (74) |
| Invention flame retardant composition | 1459 | 1262 | 449 (69) |

Heat profile: 1$^{st}$ stage: 90 minutes at 100° C., second stage: 120 minutes at 160° C., flax woven fabric.

The fabric treated with the invention flame retardant composition of Example 2 had a percentage loss of tensile strength of 69% after being exposed to the full heat profile compared to 74% for fabric treated with a mixture of diammonium phosphate and urea only.

EXAMPLE 14

Flax samples were treated with the invention flame retardant composition prepared in accordance with Example 4 or with Flammentin® MSG on its own. Treated samples were exposed to a heat profile in an oven and tensile strength was determined according to ISO 13934-1:1999 Textiles—Tensile properties of fabrics—Part 1: Determination of maximum force and elongation at maximum force using the strip method. The gauge length was 200 mm and the rate of extension was 100 mm/min. The results are shown in Table 7.

TABLE 7

| Sample | Tensile strength - after treatment (N) | Tensile strength - after $1^{st}$ stage (N) | Tensile strength - after $1^{st}$ and $2^{nd}$ stages (N), % loss in brackets |
|---|---|---|---|
| Flammentin ® MSG as is | 1080 | 1122 | 861 (20) |
| Invention flame retardant composition | 1177 | 1238 | 1003 (15) |

Heat profile: $1^{st}$ stage: 90 minutes at 100° C., second stage: 120 minutes at 145° C., flax woven fabric.

The fabric treated with the invention flame retardant composition of Example 4 had a percentage loss of tensile strength of 15% after being exposed to the full heat profile compared to 20% for fabric treated with the Flammentin® MSG on its own.

EXAMPLE 15

Flax samples were treated with the invention flame retardant composition prepared in accordance with Example 1 or with Flammentin® TL833 on its own. Treated samples were exposed to a heat profile in an oven and tensile strength was determined according to ISO 13934-1:1999 Textiles—Tensile properties of fabrics—Part 1: Determination of maximum force and elongation at maximum force using the strip method. The gauge length was 200 mm and the rate of extension was 100 mm/min. The results are shown in Table 8.

TABLE 8

| Sample | Tensile strength - after treatment (N) | Tensile strength - after $1^{st}$ stage (N) | Tensile strength - after $1^{st}$ and $2^{nd}$ stages (N), % loss in brackets |
|---|---|---|---|
| Flammentin ® TL833 as is | 1318 | 1396 | 431 (67) |
| Invention flame retardant composition | 1340 | 1337 | 995 (26) |

Heat profile: $1^{st}$ stage: 90 minutes at 100° C., second stage: 120 minutes at 145° C., flax woven fabric.

The fabric treated with the invention flame retardant composition of Example 1 had a percentage loss of tensile strength of 26% after being exposed to the full heat profile compared to 67% for fabric treated with the Flammentin® TL833 on its own.

EXAMPLE 16

Flax samples were treated with the invention flame retardant composition prepared in accordance with Example 4 or with Flammentin® MSG on its own. Treated samples were exposed to a heat profile in an oven and tensile strength was determined according to ISO 13934-1:1999 Textiles—Tensile properties of fabrics—Part 1: Determination of maximum force and elongation at maximum force using the strip method. The gauge length was 200 mm and the rate of extension was 100 mm/min. The results are shown in Table 9.

TABLE 9

| Sample | Tensile strength - after treatment (N) | Tensile strength - after $1^{st}$ stage (N) | Tensile strength - after $1^{st}$ and $2^{nd}$ stages (N), % loss in brackets |
|---|---|---|---|
| Flammentin ® MSG as is | 1080 | 1122 | 865 (20) |
| Invention flame retardant composition | 1177 | 1238 | 1009 (14) |

Heat profile: $1^{st}$ stage: 90 minutes at 100° C., second stage: 180 minutes at 145° C., flax woven fabric.

The fabric treated with the invention flame retardant composition of Example 4 had a percentage loss of tensile strength of 14% after being exposed to the full heat profile compared to 20% for fabric treated with the Flammentin® MSG on its own.

EXAMPLE 17

Flax samples were treated with the invention flame retardant composition prepared in accordance with Example 1 or with Flammentin® TL833 on its own. Treated samples were exposed to a heat profile in an oven and tensile strength was determined according to ISO 13934-1:1999 Textiles—Tensile properties of fabrics—Part 1: Determination of maximum force and elongation at maximum force using the strip method. The gauge length was 200 mm and the rate of extension was 100 mm/min. The results are shown in Table 10.

TABLE 10

| Sample | Tensile strength - after treatment (N) | Tensile strength - after $1^{st}$ stage (N) | Tensile strength - after $1^{st}$ and $2^{nd}$ stages (N), % loss in brackets |
|---|---|---|---|
| Flammentin ® TL833 as is | 1318 | 1396 | 296 (76) |
| Invention flame retardant composition | 1340 | 1337 | 738 (45) |

Heat profile: $1^{st}$ stage: 90 minutes at 100° C., second stage: 180 minutes at 145° C., flax woven fabric.

The fabric treated with the invention flame retardant composition of Example 1 had a percentage loss of tensile strength of 45% after being exposed to the full heat profile compared to 76% for fabric treated with the Flammentin® TL833 on its own.

EXAMPLE 18

Flax samples were treated with the invention flame retardant composition prepared in accordance with Example 1, or as modified as shown in Table 11 or with Flammentin® TL833 on its own. Treated samples were exposed to a heat profile (different from the heat profile used in Example 17) in an oven and tensile strength was determined according to ISO 13934-1:1999 Textiles—Tensile properties of fabrics—Part 1: Determination of maximum force and elongation at maximum force using the strip method. The gauge length was 200 mm and the rate of extension was 100 mm/min. The results are shown in Table 11.

TABLE 11

| Sample | Tensile strength - after treatment (N) | Tensile strength - after $1^{st}$ stage (N) | Tensile strength - after $1^{st}$ and $2^{nd}$ stages (N), % loss in brackets |
|---|---|---|---|
| Flammentin ® TL833 as is | 1318 | 1396 | 148 (89) |
| Invention flame retardant composition according to Example 1 | 1340 | 1337 | 361 (73) |
| Invention flame retardant composition according to Example 1, but with lower Flammentin ® TL833 concentration (~16%) | 1187 | 1287 | 366 (69) |
| Invention flame retardant composition according to Example 1, but with zinc borate ZB-467 ($4ZnO \cdot 6B_2O_3 \cdot 7H_2O$) substituted for ZB-223 | 1412 | 1421 | 403 (71) |

Heat profile: $1^{st}$ stage: 90 minutes at 100° C., second stage: 120 minutes at 160° C., flax woven fabric.

The fabric treated with the invention flame retardant composition of Example 1 had a percentage loss of tensile strength of 73% after being exposed to the full heat profile compared to 89% for fabric treated with the Flammentin® TL833 on its own. A lower concentration of Flammentin® TL833 (~16%) in the flame retardant composition of the invention resulted in a strength loss of 69%, and substituting ZB-467 for ZB-223 in the flame retardant composition of the invention resulted in a strength loss of 71%. The strength losses were lower than for the Flammentin® TL833 on its own (89%).

EXAMPLE 19

Flax samples were treated with the invention flame retardant composition prepared in accordance with Example 1, or as modified as shown in Table 12 (see below) or with Flammentin® TL833 on its own. Treated samples were exposed to a heat profile in an oven and tensile strength was determined according to ISO 13934-1:1999 Textiles—Tensile properties of fabrics—Part 1: Determination of maximum force and elongation at maximum force using the strip method. The gauge length was 200 mm and the rate of extension was 100 mm/min. The results are shown in Table 12.

TABLE 12

| Sample | Tensile strength - after treatment (N) | Tensile strength - after $1^{st}$ stage (N) | Tensile strength - after $1^{st}$ and $2^{nd}$ stages (N), % loss in brackets |
|---|---|---|---|
| Flammentin ® TL833 as is | 1318 | 1396 | 431 (67) |
| Invention flame retardant composition according to Example 1 | 1340 | 1337 | 995 (26) |
| Invention flame retardant composition according to Example 1, but with lower Flammentin ® TL833 concentration (~16%) | 1187 | 1287 | 638 (46) |
| Invention flame retardant composition according to Example 1, but with zinc borate ZB-467 ($4ZnO \cdot 6B_2O_3 \cdot 7H_2O$) substituted for ZB-223 | 1412 | 1421 | 652 (54) |

Heat profile: 1st stage: 90 minutes at 100° C., second stage: 120 minutes at 145° C., flax woven fabric.

The fabric treated with the invention flame retardant composition of Example 1 had a percentage loss of tensile strength of 26% after being exposed to the full heat profile compared to 67% for fabric treated with the Flammentin® TL833 on its own. A lower concentration of Flammentin® TL833 (~16%) in the flame retardant composition of the invention resulted in a strength loss of 46%, and substituting ZB-467 for ZB-223 in the flame retardant composition of the invention resulted in a strength loss of 54%. The strength losses were lower than for the Flammentin® TL833 on its own (67%).

EXAMPLE 20

Cotton woven fabric samples were treated with the invention flame retardant composition prepared in accordance with Example 1, or as modified as shown in Table 13 (see below) or with Flammentin® TL833 on its own. Treated samples were exposed to a heat profile in an oven and tensile strength was determined according to ISO 13934-1:1999 Textiles—Tensile properties of fabrics—Part 1: Determination of maximum force and elongation at maximum force using the strip method. The gauge length was 200 mm and the rate of extension was 100 mm/min. The results are shown in Table 13.

TABLE 13

| Sample | Tensile strength - after treatment (N) | Tensile strength - after $1^{st}$ stage (N) | Tensile strength - after $1^{st}$ and $2^{nd}$ stages (N), % loss in brackets |
|---|---|---|---|
| Flammentin ® TL833 as is | 910 | 617 | 31 (97) |
| Invention flame retardant composition according to Example 1 | 930 | 911 | 290 (69) |
| Invention flame retardant composition according to Example 1, but with lower Flammentin ® TL833 concentration (~12%) | 870 | 870 | 237 (73) |

Heat profile: $1^{st}$ stage: 90 minutes at 100° C., second stage: 120 minutes at 160° C., cotton woven fabric.

The cotton fabric treated with the invention flame retardant composition of Example 1 had a percentage loss of tensile strength of 69% after being exposed to the full heat profile compared to 97% for fabric treated with the Flammentin® TL833 on its own. A lower concentration of Flammentin® TL833 (~12%) in the flame retardant composition of the invention resulted in a strength loss of 73%. The strength loss was lower than for the Flammentin® TL833 on its own (97%).

Cellulosic materials, such as flax and cotton, treated by known conventional methods using the flame retardant composition of the invention surprisingly show a lower loss of strength when exposed to short-term heating compared to cellulosic material treated with a phosphate-based flame retardant on its own, or mixtures of the phosphate-based flame retardant with only ammonium hydroxide or with only zinc borate. When the phosphate-based flame retardant is admixed with zinc borate only, because of its low water solubility, the zinc borate settles out as soon as stirring of the solution ceases.

An advantage of this invention, as illustrated, is that there is lower strength loss of flame-retardant treated cellulosic materials when exposed to short-term heating as would be experienced, for example, in the production of natural fibre-based composite materials. In short, the invention, as illustrated, helps to reduce strength loss of cellulosic materials when exposed to heat. The cellulosic materials treated with the flame retardant composition of the invention showed a tensile strength of between about 1.2 times and about 8 times higher compared to cellulosic materials treated with a phosphate-based flame retardant such as Flammentin® KRE on its own.

The invention claimed is:

1. A method of inhibiting strength loss in a cellulosic material which is in the form of a textile or cloth and that forms part of a composite material, when the cellulosic material is exposed to heat, the method comprising treating the cellulosic material, prior to incorporation of the cellulosic material in the composition material, with an aqueous liquid flame retardant composition, wherein the aqueous liquid flame retardant composition comprises a non-durable or semi-durable phosphate-based flame retardant, ammonium hydroxide and a zinc borate, to provide the cellulosic material with non-durable flame retardancy, wherein the treated cellulosic material after exposure to a heat profile of 100° C. for 90 minutes and then 160° C. for 120 minutes shows a tensile strength, determined in accordance with ISO 13934-1:1999 Textiles—Tensile properties of fabrics—Part 1: Determination of maximum force and elongation at maximum force using the strip method, at least 1.2 times higher than the tensile strength of cellulosic material treated with just the phosphate-based flame retardant, after exposure to the same heat profile.

2. The method of claim 1, wherein the cellulosic material is flax.

3. The method of claim 1, wherein the cellulosic material is cotton.

4. The method of claim 1, wherein the cellulosic material comprises hemp, kenaf, or bamboo fibres.

5. The method of claim 1, wherein the treated cellulosic material is incorporated into a pre-preg.

6. The method of claim 1, wherein the aqueous liquid flame retardant composition is a non-halogenated flame retardant composition, wherein the non-halogenated flame retardant composition comprises a non-halogenated flame retardant as the only flame retardant or as the major flame retardant, and wherein the major flame retardant is the flame retardant present in an admixture in the highest concentration.

7. The method of claim 6, wherein the non-halogenated major flame retardant is the phosphate-based flame retardant or wherein the non-halogenated major flame retardant is present in an admixture with the phosphate-based flame retardant.

8. The method of claim 1, wherein the phosphate-based flame retardant is or comprises a phosphorous-nitrogen compound.

9. The method of claim 1, wherein the phosphate-based flame retardant comprises or is diammonium phosphate, a mixture of diammonium phosphate and urea, an organic phosphorous-nitrogen phosphate compound, a mixture of organic and inorganic phosphorous and nitrogen compounds of which at least one is a phosphate, or a nitrogen-containing phosphoric acid salt, or any mixtures of two or more of the foregoing.

10. The method of claim 1, wherein the aqueous liquid flame retardant composition comprises between 5% and 50% by mass of the phosphate-based flame retardant on a solids basis.

11. The method of claim 1, wherein the aqueous liquid flame retardant composition comprises between 5% and 30% by mass of the ammonium hydroxide.

12. The method of claim 1, wherein the aqueous liquid flame retardant composition comprises between 1% and 25% by mass of the zinc borate.

13. The method of claim 1, wherein the aqueous liquid flame retardant composition comprises between 5% and 40% by mass of the phosphate-based flame retardant on a solids basis.

14. The method of claim 1, wherein the aqueous liquid flame retardant composition comprises between 10% and 30% by mass of the phosphate-based flame retardant on a solids basis.

15. The method of claim 1, wherein the aqueous liquid flame retardant composition comprises between 5% and 25% by mass of the ammonium hydroxide.

16. The method of claim 1, wherein the aqueous liquid flame retardant composition comprises between 8 and 20% by mass of the ammonium hydroxide.

17. The method of claim 1, wherein the aqueous liquid flame retardant composition comprises between 2% and 15% by mass of the zinc borate.

18. The method of claim 1, wherein the aqueous liquid flame retardant composition comprises between 3% and 7% by mass of the zinc borate.

19. A method of inhibiting strength loss in a cellulosic material, selected from the group consisting of flax, cotton, hemp fibres, kenaf fibres and bamboo fibres, which is in the form of a textile or cloth and that forms part of a composite material, when the cellulosic material is exposed to heat, the method comprising treating the cellulosic material, prior to incorporation of the cellulosic material in the composite material, with an aqueous liquid flame retardant composition, wherein the aqueous liquid flame retardant composition comprises a non-durable or semi-durable phosphate-based flame retardant, ammonium hydroxide and a zinc borate, to provide the cellulosic material with non-durable flame retardancy, wherein the non-durable or semi-durable phosphate-based flame retardant comprises or is diammonium phosphate, a mixture of diammonium phosphate and urea, an organic phosphorous-nitrogen phosphate compound, a mixture of organic and inorganic phosphorous and nitrogen compounds of which at least one is a phosphate, or a nitrogen-containing phosphoric acid salt, or any mixtures of two or more of the foregoing, wherein the aqueous liquid flame retardant composition comprises between 5% and 50% by mass of the phosphate-based flame retardant, on a solids basis, wherein the aqueous liquid flame retardant composition comprises between 5% and 30% by mass of the ammonium hydroxide, wherein the aqueous liquid flame retardant composition comprises between 1% and 25% by mass of the zinc borate, and wherein the treated cellulosic material after exposure to a heat profile of 100° C. for 90 minutes and then 160° C. for 120 minutes shows a tensile strength, determined in accordance with ISO 13934-1:1999 Textiles—Tensile properties of fabrics—Part 1: Determination of maximum force and elongation at maximum force using the strip method, at least 1.2 times higher than the tensile strength of cellulosic material treated with just the phosphate-based flame retardant, after exposure to the same heat profile.

* * * * *